United States Patent
Kano et al.

[11] Patent Number: 5,213,314
[45] Date of Patent: May 25, 1993

[54] SPRING CONTACT

[75] Inventors: Toshiji Kano; Kenji Katayose, both of Tokyo, Japan

[73] Assignee: Hirose Electric Co., Ltd., Tokyo, Japan

[21] Appl. No.: 745,690

[22] Filed: Aug. 16, 1991

[30] Foreign Application Priority Data

Sep. 13, 1990 [JP] Japan .................. 2-95566[U]

[51] Int. Cl.$^5$ .................................................. F16F 1/18
[52] U.S. Cl. ........................................ 267/163; 200/284
[58] Field of Search ............. 207/158, 159, 163, 164, 207/165; 200/275, 283, 284, 293, 276, 530, 531, 532

[56] References Cited

U.S. PATENT DOCUMENTS

| | | | |
|---|---|---|---|
| 2,193,008 | 3/1940 | Puerner | 200/284 |
| 2,612,368 | 9/1952 | Ransome | 267/163 |
| 2,714,637 | 8/1955 | Schmocker | 200/283 |
| 2,788,419 | 4/1957 | Young | 200/283 |
| 3,437,772 | 4/1969 | Piber | 200/284 |

FOREIGN PATENT DOCUMENTS 816174 7/1959 United Kingdom ............... 267/163

Primary Examiner—Matthew C. Graham
Attorney, Agent, or Firm—Kanesaka & Takeuchi

[57] ABSTRACT

A spring contact device consists of an insulative case (7) having at least one pair of slots (8) extending upwardly from a bottom thereof and a contact spring (1) which includes a leaf spring portion made from a spring metal sheet; a U-shaped contact portion (3) made by bending upwardly and then downwardly an end portion of the upper section of the U-shaped leaf spring such that the contact portion projects through a top of the case; a pair of curled portions (4) extending inwardly from opposite sides of each leg of the U-shaped contact portion; a terminal portion (5) made from an end portion of the lower section of the U-shaped leaf spring portion so as to project downwardly from a bottom of the case; a U-shaped leaf spring portion between the contact and terminal portions; and at least one pair of lugs (6) extending upwardly from a lower section (2) of the U-shaped leaf spring portion and press fitted into the slots for securing the spring contact to the case.

1 Claim, 3 Drawing Sheets

SPRING CONTACT

BACKGROUND OF THE INVENTION

1. Field of the Invention

The present invention relates to spring contacts for battery packs, etc.

2. Description of the Prior Art

FIG. 7 shows a conventional spring contact which includes a cylindrical sleeve 11; a semi-spherical contact 12 provided at the top of the cylindrical sleeve 11; a connection terminal 13 projecting through the bottom of the cylindrical sleeve 11 for soldering to a lead wire; and a conductive coil spring 14 placed between the contact 12 and the terminal 13 so that the contact 12 is movable in the direction of an arrow. However, since the contact 12 and the terminal 13 are connected via the coil spring 14 of fine wire, the contact resistance between them can be unstable.

To improve such a disadvantage, Japanese U.M. Patent Application Kokai No. 63-23776 has proposed a spring contact such as shown in FIG. 8. The spring contact includes a leaf spring 23 having a contact 21 at one end and a terminal 22 at the other. The spring contact is mounted in a case (not shown) such that the contact 21 projects through the top of the case and the terminal 22 projects through the bottom of the case. This spring contact is made by eyeletting or welding the contact 21 to the leaf spring 23, making the manufacture complicated. In addition, the connection conditions between these two components can disperse, bringing about a dispersion in the contact resistance.

SUMMARY OF THE INVENTION

Accordingly, it is an object of the invention to provide a spring contact in which the contact portion and the spring portion are integrated, thereby reducing the number of process steps and increasing the product reliability.

According to the invention there is provided a spring contact device which includes an insulative case having at least one pair of slots extending upwardly from a bottom thereof; and a spring contact attached to the insulative case. The spring contact which includes a U-shaped leaf spring portion made from a spring metal sheet; a U-shaped contact portion made by bending upwardly and then downwardly an end portion of an upper section of the U-shaped leaf spring portion such that the contact portion projects through a top of the case; a pair of curled portioned extending inwardly from opposite sides of each leg of the U-shaped contact portion; a terminal portion made from an end portion of a lower section of the U-shaped leaf spring portion so as to project downwardly from a bottom of the case; and at least one pair of securing means extending upwardly from a lower section of the U-shaped leaf spring portion and press fitted into the slots for securing the spring contact to the case.

The above and other objects, features, and advantages of the invention will be more apparent from the following description when taken in conjunction with the accompanying drawings.

DESCRIPTION OF THE PREFERRED EMBODIMENT

Figure 1:
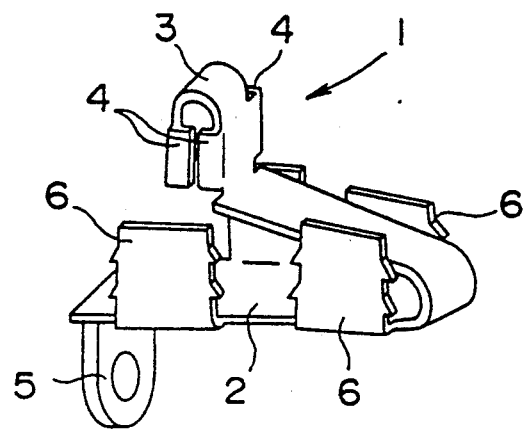
FIG. 1 is a perspective view of a spring contact according to an embodiment of the invention.
Figure 2:
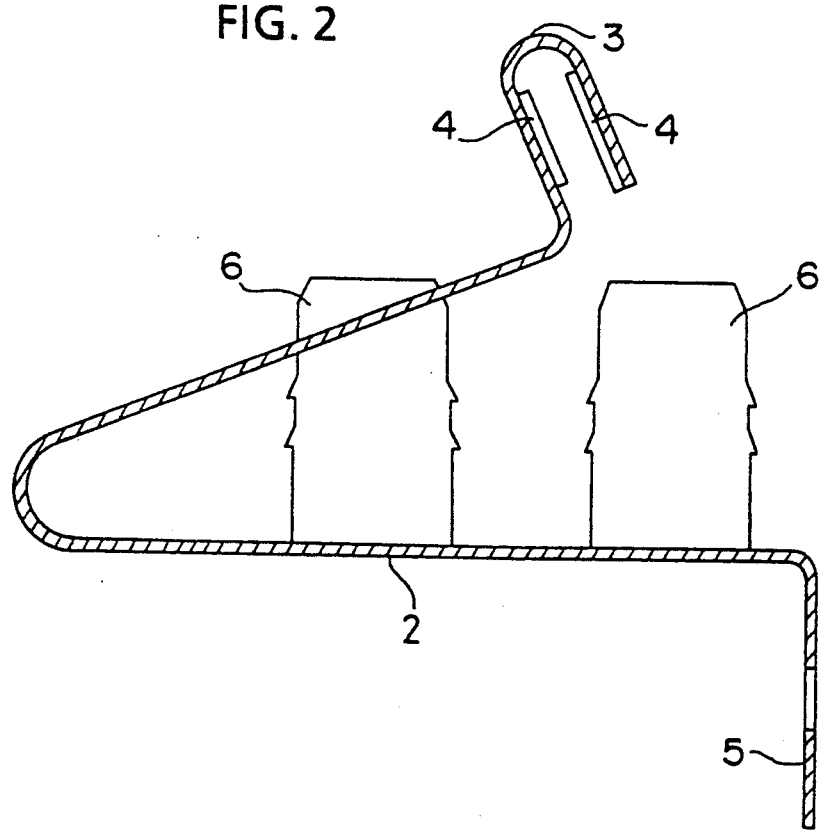
FIG. 2 is a longitudinal section of the spring contact.

In FIGS. 1-2, a spring contact 1 includes a U-shaped leaf spring section made by bending into a section a spring sheet which is made from phosphorous bronze and having a constant thickness; e.g., 0.2 mm. The end portion of the upper section of the leaf spring section is bent upwardly at substantially right angles and then downwardly to form a U-shaped contact portion 3 which is to be brought into contact with a battery, etc. A pair of curled portions 4 extend inwardly from opposite sides of each leg of the U-shaped contact portion 3. The other end portion constitutes a connection terminal 5 to which a lead wire, for example, is connected. Two pairs of lugs 6 extend upwardly from the lower section 2 of the U-shaped leaf spring. These lugs 5 are press fitted in slots of the case to secure the spring contact 1 to the case. Such a one-piece spring contact 1 is formed by a press from the spring sheet of a constant thickness.

Figure 3:
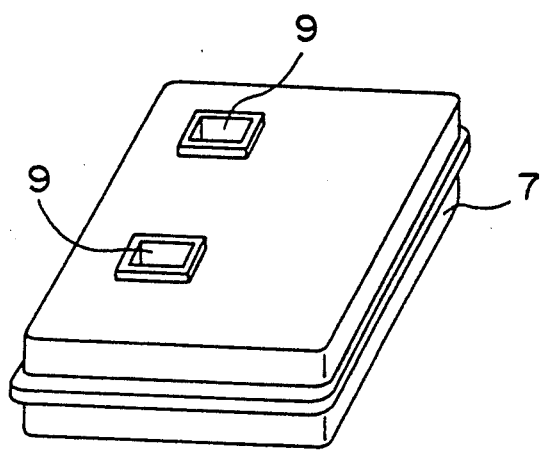
FIG. 3 is a perspective view of a case wherein the spring contact is set.
Figure 4:
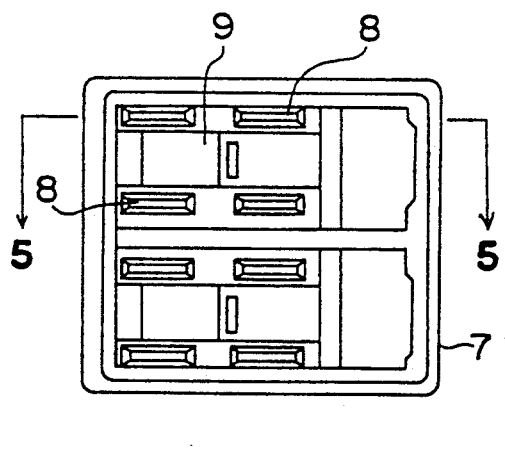
FIG. 4 is a bottom plan view of the case.
Figure 5:
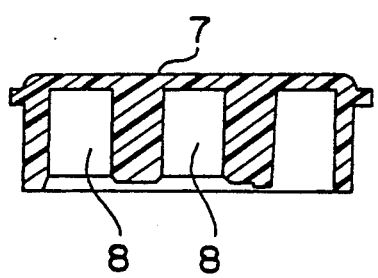
FIG. 5 is a sectional view taken along line 5—5 of FIG. 4.
Figure 6:
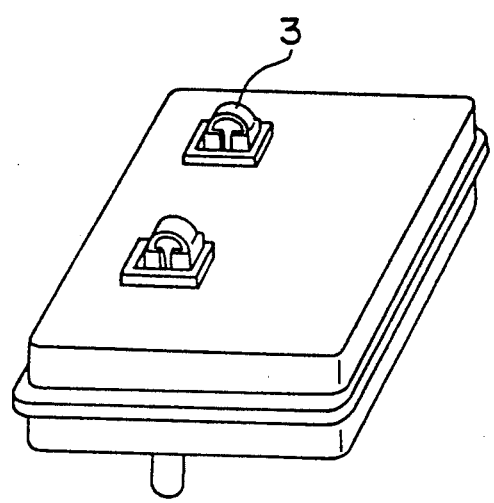
FIG. 6 is a perspective view of the case wherein a pair of spring contacts are set.
Figure 7:
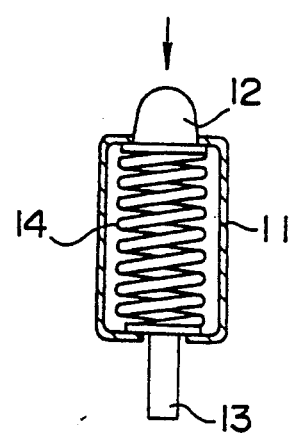
FIG. 7 is a section view of a conventional spring contact.
Figure 8:
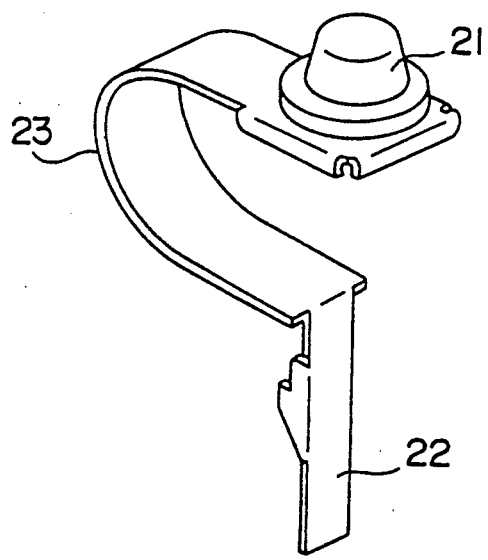
FIG. 8 is a perspective view of another conventional spring contact.

In FIGS. 3-5, the spring contact 1 is set in a case 7 which is made from an insulative synthetic resin. The case 7 has eight press fit slots 8 extending upwardly from the bottom. The spring contact 1 is secured to the case 7 by press fitting the lugs 6 of the spring contact 1 into these slots 8 such that the contact portion 3 projects through a contact aperture 9 on the top of the case 6 for contact with a battery (not shown). Between the contact aperture 9 and the contact portion 3 there is provided a gap sufficiently large to permit the curled portions 4 of the contact portion 3 to slide along the contact aperture 9. The connection terminal 5 extends downwardly through the bottom of the case 6 and connected to a lead wire (not shown). In FIG. 6, a pair of such spring contacts 1 are set in the case 7.

The spring contact 1 includes a U-shaped leaf spring section which has a resilient property for upwardly biasing the contact portion 3 so that the contact portion 3 is brought into contact with a mating surface with an appropriate force, thereby not only assuring an appropriate electrical conductivity but also producing a self-cleaning effect by friction, which makes a better contact.

As has been described above, according to the invention, the contact portion and the spring portion are made integral, thereby not only making the manufacture simpler than before but also providing reliable products having little or no dispersion in the contact resistance.

What is claimed is:

1. A spring contact device comprising:

an insulative case having a contact aperture on a top thereof and at least one pair of slots extending upwardly from a bottom thereof; and a spring contact attached to said insulative case, said spring contact comprising:

a U-shaped leaf spring portion made from a spring metal sheet;

a U-shaped contact portion made by bending upwardly and then downwardly an end portion of an upper section of said U-shaped leaf spring portion such that said contact portion projects through said contact aperture of said case;

a terminal portion extending downwardly from an end portion of a lower section of said U-shaped leaf spring portion through a bottom of said case; and at least one pair of barbed lugs extending upwardly from opposite sides of said lower section of said U-shaped leaf spring portion and press fitted into said slots for securing said spring contact to said case.

* * * * *